(12) United States Patent
Pham et al.

(10) Patent No.: US 12,017,441 B2
(45) Date of Patent: Jun. 25, 2024

(54) SOUND ATTENUATING BUILDING PANELS

(71) Applicant: ARMSTRONG WORLD INDUSTRIES, INC., Lancaster, PA (US)

(72) Inventors: Phi-Oanh R. Pham, Lancaster, PA (US); William H. Frantz, Elizabethtown, PA (US); Sean D. Browne, Lancaster, PA (US)

(73) Assignee: AWI Licensing LLC, Wilmington, DE (US)

( * ) Notice: Subject to any disclaimer, the term of this patent is extended or adjusted under 35 U.S.C. 154(b) by 286 days.

(21) Appl. No.: 17/165,478

(22) Filed: Feb. 2, 2021

(65) Prior Publication Data

US 2021/0245471 A1    Aug. 12, 2021

Related U.S. Application Data

(60) Provisional application No. 62/971,463, filed on Feb. 7, 2020.

(51) Int. Cl.
*E04B 9/04* (2006.01)
*B32B 5/22* (2006.01)
(Continued)

(52) U.S. Cl.
CPC ............ *B32B 5/245* (2013.01); *B32B 13/045* (2013.01); *B32B 13/14* (2013.01); *B32B 18/00* (2013.01);
(Continued)

(58) Field of Classification Search
CPC ....... B32B 5/245; B32B 13/045; B32B 13/14; B32B 18/00; B32B 2262/101;
(Continued)

(56) References Cited

U.S. PATENT DOCUMENTS

| 4,428,454 A | 1/1984 | Capaul et al. |
| 6,510,665 B2 * | 1/2003 | Pervan ................... E04F 15/04 52/592.4 |

(Continued)

FOREIGN PATENT DOCUMENTS

| EP | 0092684 A2 | 3/1983 |
| EP | 2116661 A1 | 11/2009 |

(Continued)

OTHER PUBLICATIONS

International Search Report for related application No. PCT/US2021/016216 dated May 26, 2021.

*Primary Examiner* — James J Buckle, Jr.
(74) *Attorney, Agent, or Firm* — Patrick Sheldrake

(57) ABSTRACT

An acoustical ceiling panel including a first layer having a first major surface opposite a second major surface and a side surface extending therebetween, a second layer having a first major surface opposite a second major surface and a side surface extending therebetween, and a sealing layer having a first major surface opposite a second major surface and a side surface extending therebetween. The sealing layer may be positioned between the first major surface of the first layer and the second major surface of the second layer. The side surface of the sealing layer may extend beyond the side surface of the first layer and the side surface of the second layer.

19 Claims, 10 Drawing Sheets

(51) Int. Cl.
  *B32B 5/24* (2006.01)
  *B32B 13/04* (2006.01)
  *B32B 13/14* (2006.01)
  *B32B 18/00* (2006.01)
  *E04B 9/00* (2006.01)

(52) U.S. Cl.
  CPC .......... *E04B 9/001* (2013.01); *B32B 2250/03* (2013.01); *B32B 2262/101* (2013.01); *B32B 2262/108* (2013.01); *B32B 2266/0221* (2013.01); *B32B 2266/08* (2013.01); *B32B 2607/00* (2013.01); *E04B 9/045* (2013.01)

(58) Field of Classification Search
  CPC ...... B32B 2262/108; B32B 2266/0221; B32B 2266/08; B32B 2250/03; B32B 2607/00; E04B 9/001; E04B 9/045; E04F 2201/00; E04F 2201/01; E04F 2201/0107; E04F 2201/021; E04F 2201/023
  USPC ....................................................... 52/220.6
  See application file for complete search history.

(56) References Cited

U.S. PATENT DOCUMENTS

| | | | | |
|---|---|---|---|---|
| 7,155,871 | B1* | 1/2007 | Stone | B32B 27/00 52/611 |
| 7,458,191 | B2* | 12/2008 | Stone | B32B 29/06 52/611 |
| 7,536,836 | B2* | 5/2009 | Moser Rossel | E04B 9/003 52/506.01 |
| 7,685,790 | B2* | 3/2010 | Stone | E04F 15/186 52/611 |
| 7,798,287 | B1* | 9/2010 | Surace | E04B 9/0435 181/290 |
| 7,877,956 | B2* | 2/2011 | Martensson | E04F 15/04 52/582.1 |
| 7,921,965 | B1* | 4/2011 | Surace | E04B 9/045 181/290 |
| 8,234,834 | B2* | 8/2012 | Martensson | E04F 15/02 52/582.1 |
| 8,869,481 | B2* | 10/2014 | Dzigava | B44C 5/04 52/311.2 |
| 9,156,233 | B2* | 10/2015 | Dossche | E04F 15/042 |
| 9,238,912 | B1* | 1/2016 | Pham | E04B 1/8409 |
| 9,390,700 | B1* | 7/2016 | Pham | B32B 37/12 |
| 9,938,717 | B2* | 4/2018 | Gaydos | E04B 9/28 |
| 11,391,049 | B2* | 7/2022 | Baert | B32B 13/04 |
| 2002/0046528 | A1* | 4/2002 | Pervan | E04F 15/04 52/581 |
| 2003/0233809 | A1* | 12/2003 | Pervan | E04F 15/02033 52/592.1 |
| 2009/0173030 | A1* | 7/2009 | Gulbrandsen | E04B 9/045 52/506.09 |
| 2010/0146887 | A1* | 6/2010 | Wiker | E04B 9/001 52/232 |
| 2011/0061324 | A1* | 3/2011 | Tinianov | E04B 1/86 156/60 |
| 2013/0118831 | A1* | 5/2013 | Kawai | G10K 11/172 181/290 |
| 2016/0273218 | A1* | 9/2016 | Gaydos | E04B 9/28 |
| 2017/0121964 | A1* | 5/2017 | Wiker | E04B 1/8409 |
| 2018/0148928 | A1* | 5/2018 | Bergman | F16B 5/125 |
| 2019/0383031 | A1* | 12/2019 | Baert | E04F 13/0866 |
| 2020/0325680 | A1* | 10/2020 | Pham | B32B 7/12 |
| 2021/0238862 | A1* | 8/2021 | Baert | B32B 13/045 |

FOREIGN PATENT DOCUMENTS

| | | |
|---|---|---|
| EP | 2975188 A1 | 1/2016 |
| WO | WO 2008/055653 A1 | 5/2008 |

* cited by examiner

SOUND ATTENUATING BUILDING PANELS

CROSS-REFERENCE TO RELATED APPLICATIONS

The present application claims the benefit of priority to U.S. Provisional Patent Application Ser. No. 62/971,463, filed on Feb. 7, 2020, the entirety of which is incorporated herein by reference.

BACKGROUND

Various types of ceiling systems have been used in commercial and residential building construction to provide the desired acoustical performance. Noise blocking between rooms is required for a variety of purposes, including speech privacy as well as not bothering the occupants of adjacent rooms. Sound dampening within a single room is also required for a variety of purposes, including decreasing volume levels within a single space.

Previous attempts have been made to improve noise blocking between adjacent rooms. However, such previous attempts either lack noise reducing performance or are limited by the maximum sound attenuation that can be achieved. Thus, there is a need for a new acoustic building panel exhibiting the desired enhanced acoustical properties.

BRIEF SUMMARY

According to some embodiments, the present invention is directed to an acoustical ceiling panel comprising: a first layer comprising a first major surface opposite a second major surface and a side surface extending there-between; a second layer comprising a first major surface opposite a second major surface and a side surface extending there-between; a sealing layer having a first major surface opposite a second major surface and a side surface extending there-between; and wherein the sealing layer is positioned between the first major surface of the first layer and the second major surface of the second layer, and wherein the side surface of the sealing layer extends beyond the side surface of the first layer and the side surface of the second layer.

Other embodiments of the present invention include an acoustical ceiling panel comprising: a first layer comprising a first major surface opposite a second major surface and a side surface extending there-between, the side surface of the first layer defining a first perimeter of the first layer; a second layer comprising a first major surface opposite a second major surface and a side surface extending there-between, the side surface of the second layer defining a second perimeter of the second layer; a sealing layer comprising a first major surface opposite a second major surface and a side surface extending there-between, the side surface of the sealing layer defining a third perimeter of the sealing layer, the sealing layer further comprising a perimeter region adjacent the third perimeter and a central region circumscribed by the perimeter region of the sealing layer; and wherein the sealing layer is positioned between the first layer and the second layer, and wherein the perimeter region of the sealing layer can flex upward and downward relative to the central region of the sealing layer.

Other embodiments of the present invention include an acoustical ceiling panel comprising a first exposed major surface opposite a second exposed major surface and an exposed side surface extending there-between, the exposed side surface comprising: a first portion that is adjacent to the first exposed major surface; a second portion that is adjacent to the second exposed major surface; and a third portion located between the first portion and the second portion; and wherein the third portion extends outward beyond the first portion and the second portion of the exposed side surface.

Other embodiments of the present invention include a ceiling system comprising: a ceiling grid comprising a plurality of first members and a plurality of second members, the first and second members intersecting one another to define a plurality of grid openings; at least one of the aforementioned acoustic ceiling panels, wherein the at least one of the acoustic ceiling panels is positioned in one of the plurality of grid openings.

Other embodiments of the present invention include a method of installing an acoustical ceiling system comprising: a) aligning an acoustic ceiling panel relative to a grid opening of a ceiling grid, the ceiling grid formed by a plurality of first members and a plurality of second members, the first and second members intersecting one another to define the grid opening, wherein the acoustic ceiling panel comprises a sealing layer positioned between a first layer and a second layer; b) moving the acoustic ceiling panel in a vertical direction into the grid opening such that the sealing layer contacts at least one of the first members and the second members; and c) resting the acoustic ceiling panel on at least one of the plurality of first members and the plurality of second members that define the grid opening.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
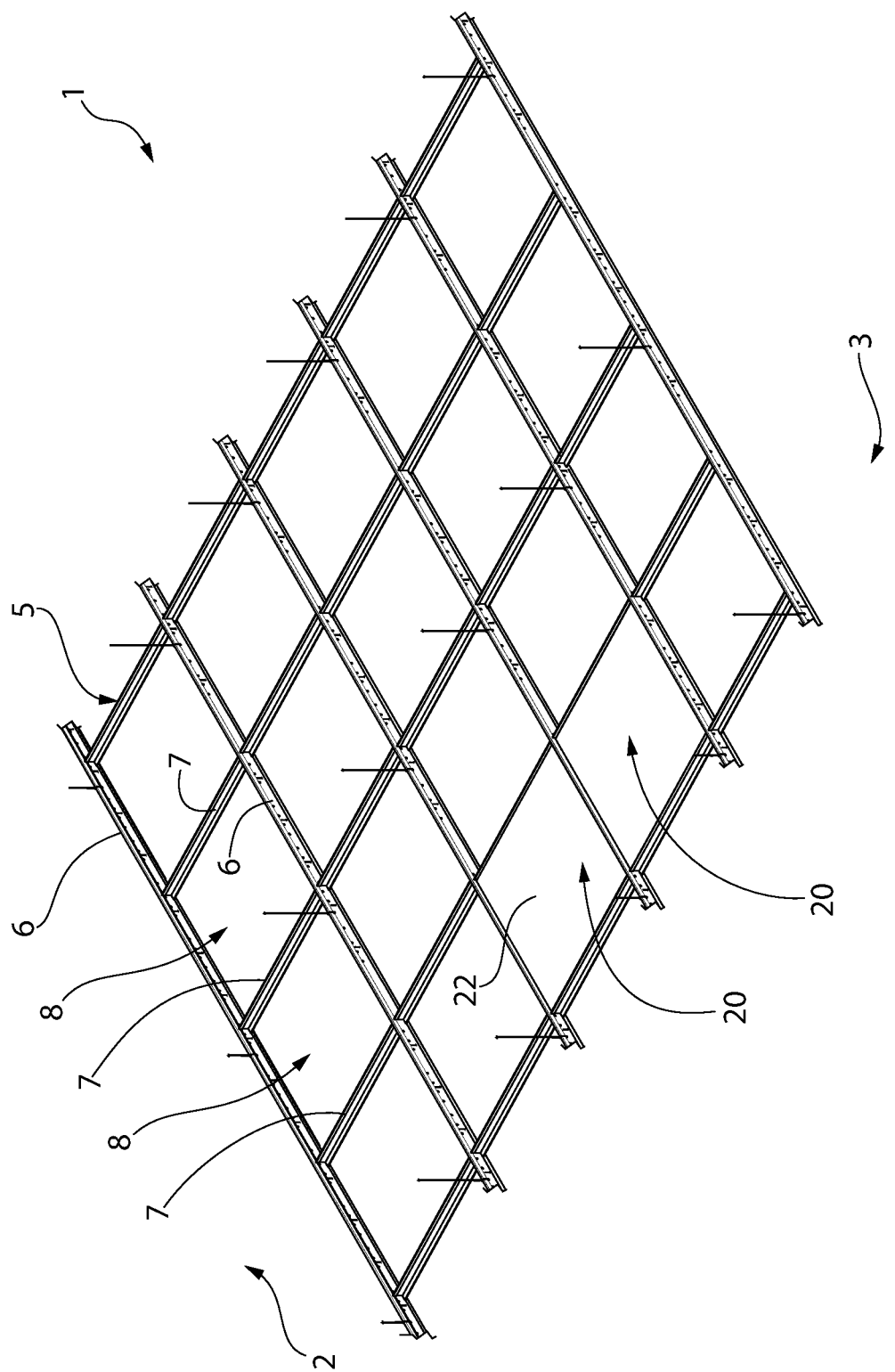
FIG. 1 is a perspective view of a ceiling system according to the present disclosure.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means +/−5% of the reference value. According to the present application, the term "substantially free" less than about 0.1 wt. % based on the total of the referenced value.

Figure 5:
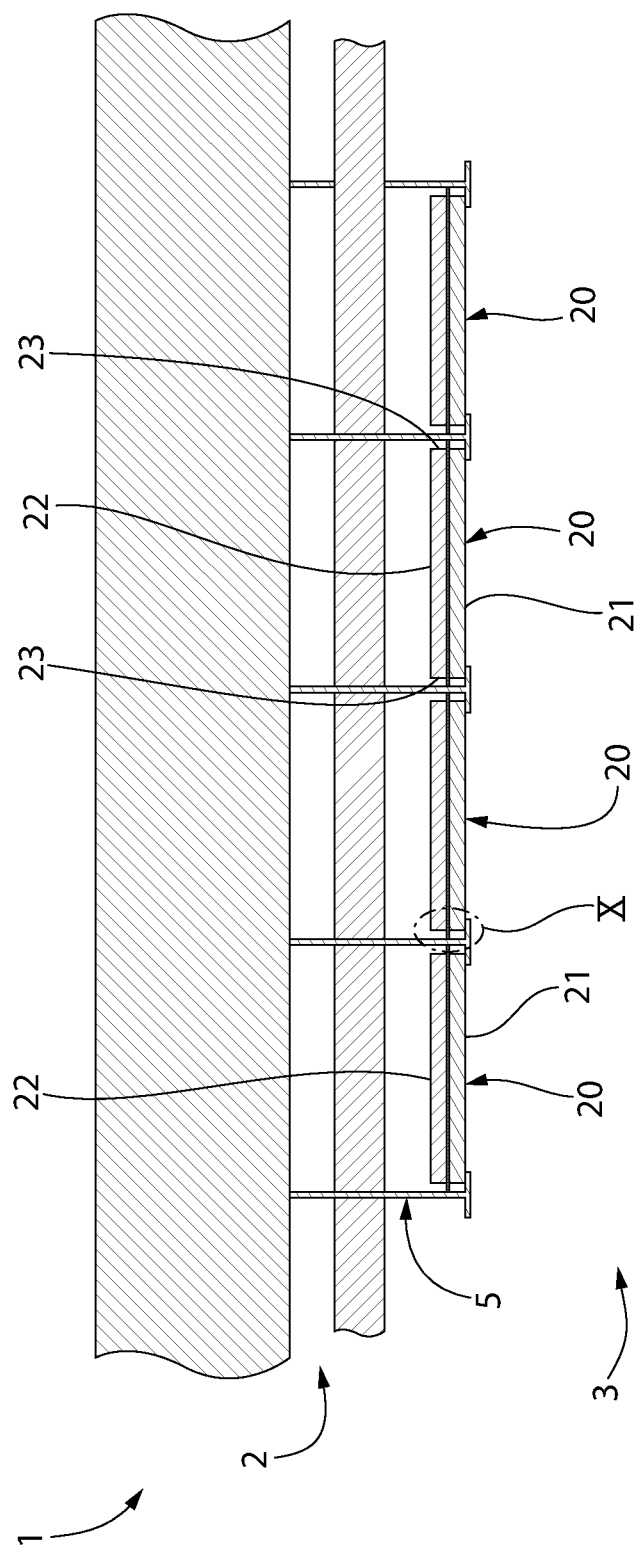
FIG. 5 is a side-view of the ceiling system of FIG. 1.

Referring now to FIGS. 1 and 5, the present invention is directed to a ceiling system 1 comprising a support grid 5 and at least one acoustic building panel 20 (also referred to as "ceiling panel"). A plenary space 2 may exist above the support grid 5 (also referred to as a "ceiling grid"). The plenary space 2 is the space that exists above the acoustic building panels 20 and above the support grid 5 and below a roof or a subfloor 4 of an above adjacent floor in a building. The plenary space 2 provides room for mechanical lines to be run throughout a building—e.g. HVAC, plumbing, data lines, etc. A room environment 3 may exist below the acoustic building panels 20 and below the support grid 5.

The room environment 3 is the space occupied by inhabitants of a room—e.g. room environments 3 in an office building would be the space occupied by desks, office workers, computers, etc. The combination of the support grid 5 and the acoustic building panels 20 may act as an acoustic, thermal, and aesthetic barrier between the room environment 3 and the plenary space 2, as well as a sound deadening layer for noise that exists within the room environment 3, as discussed herein.

The support grid 5 may comprise a plurality of first members 6 (also referred to as "first support members" or "first struts") extending parallel to each other. In some embodiments, the support grid 5 may further comprise a plurality of second members 7 that extend parallel to each other (also referred to as "first support members" or "first struts"). The plurality of first members 6 may intersect the plurality of second members 7 to form a grid pattern having a plurality of grid openings 8. In some embodiments, the plurality of first struts 6 intersects the plurality of second struts 7 at a substantially perpendicular angle, thereby forming rectangular grid openings 8. The rectangular grid openings 8 may be square or any other shape that is aesthetical or functional.

Figure 6:
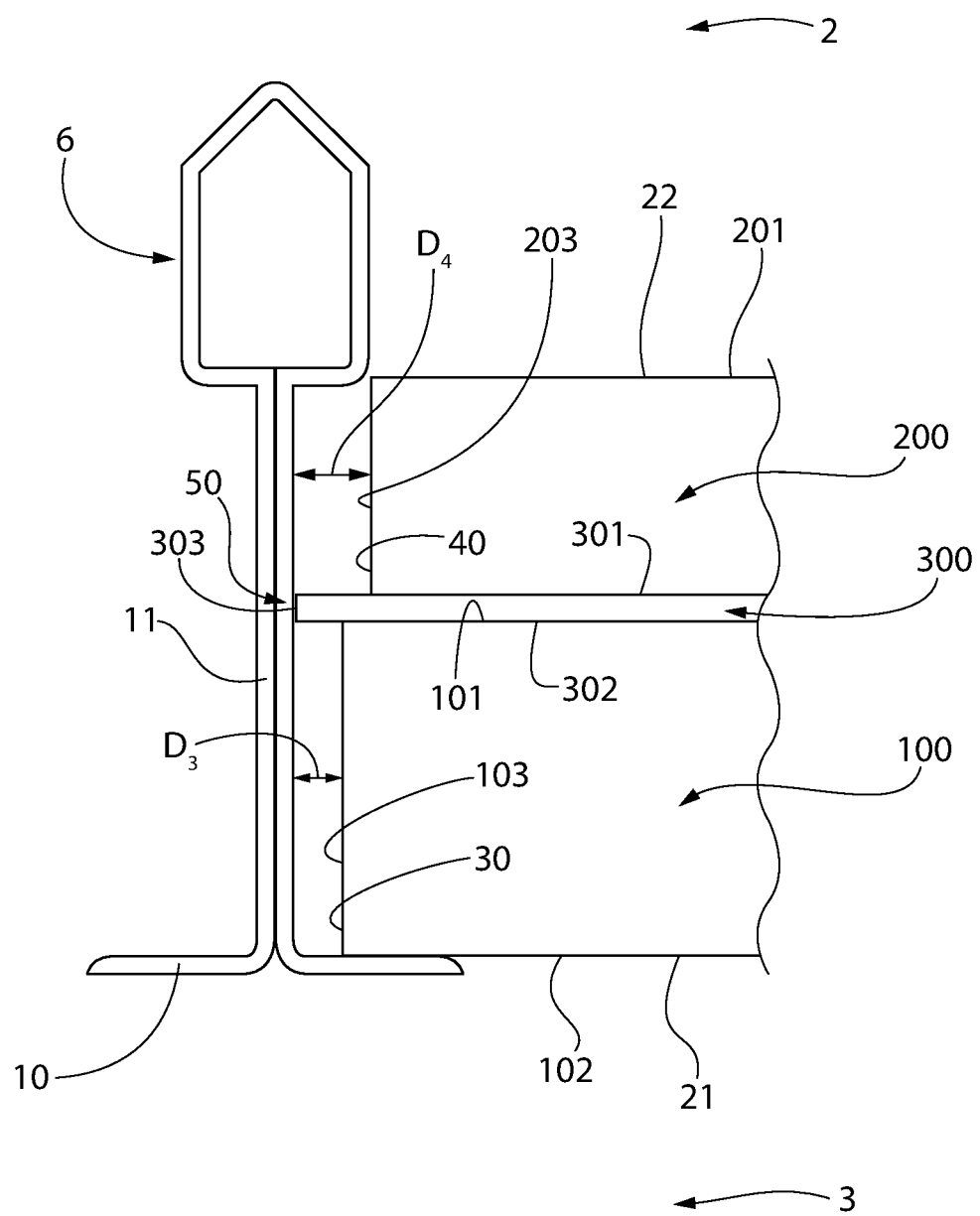
FIG. 6 is a close-up view of region X in FIG. 5.

Referring to FIG. 6 in particular, each of the plurality of first members 6 may comprises T-bars having a horizontal flange 10 (also referred to as a "bottom flange") and a web 11 (also referred to as a "vertical web"). The plenary space 2 exists above the T-bars and the room environment 3 exists below the T-bars. Although not pictured, each of the plurality of second members 7 may comprises T-bars having a horizontal flange 10 (also referred to as a "bottom flange") and a web (also referred to as a "vertical web").

Referring back to FIGS. 1 and 5, the ceiling system 1 of the present disclosure comprises at least one acoustic building panel 20 that is mounted within of the grid openings 8 of the support grid 5. The ceiling system 1 may comprises a plurality of acoustic building panels 20 mounted to the support grid 5, each of the plurality of acoustic building panels 20 resting within one of the plurality of grid openings 8. In some embodiments, something other than the acoustic building panel 20 (for example, light fixture or an air duct vent) may be mounted to the support grid 5 within at least one of the grid openings 8 (not pictured).

Figure 2:
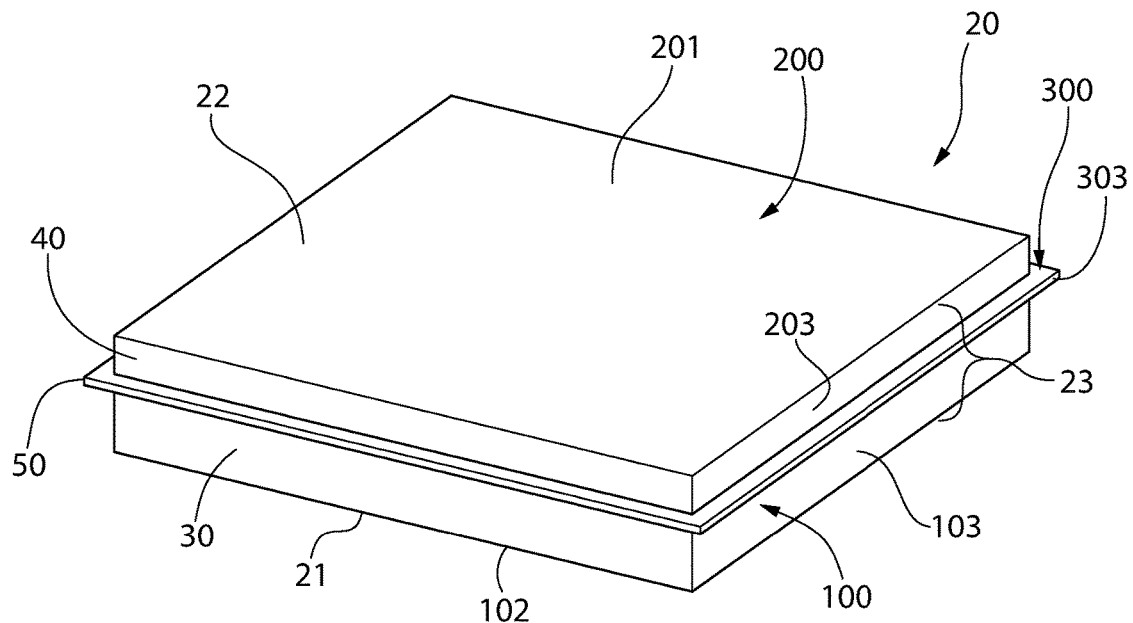
FIG. 2 is a perspective view of an acoustic ceiling panel of the present disclosure.
Figure 3:
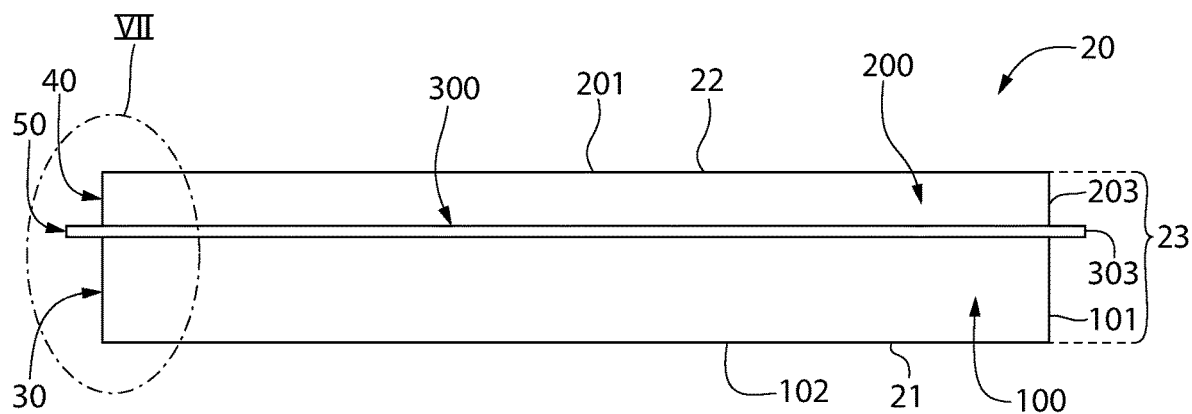
FIG. 3 is a side view of the acoustic ceiling panel of FIG. 2.
Figure 4:
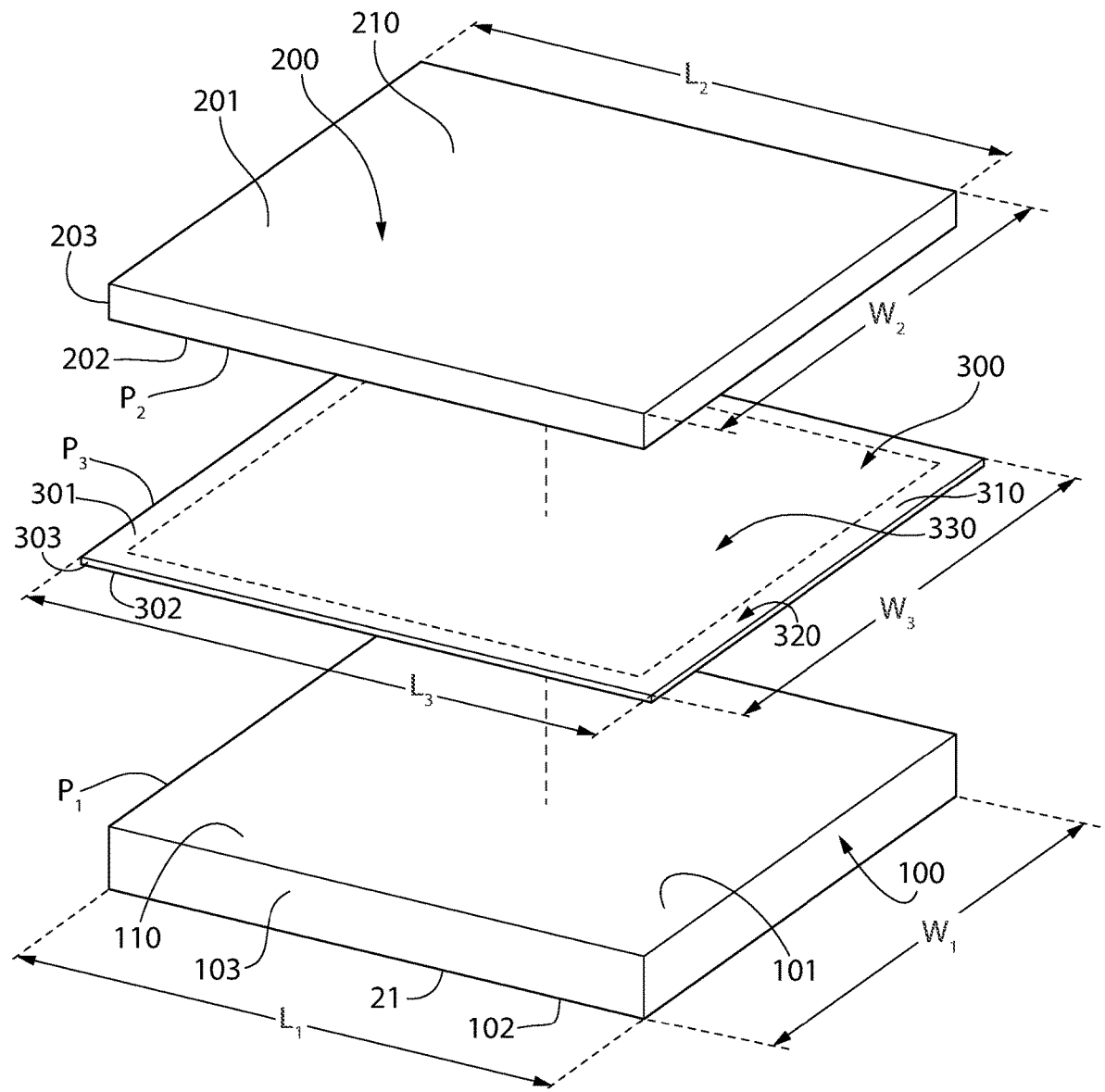
FIG. 4 is an exploded perspective view of the acoustic ceiling panel of FIG. 2.
Figure 7:
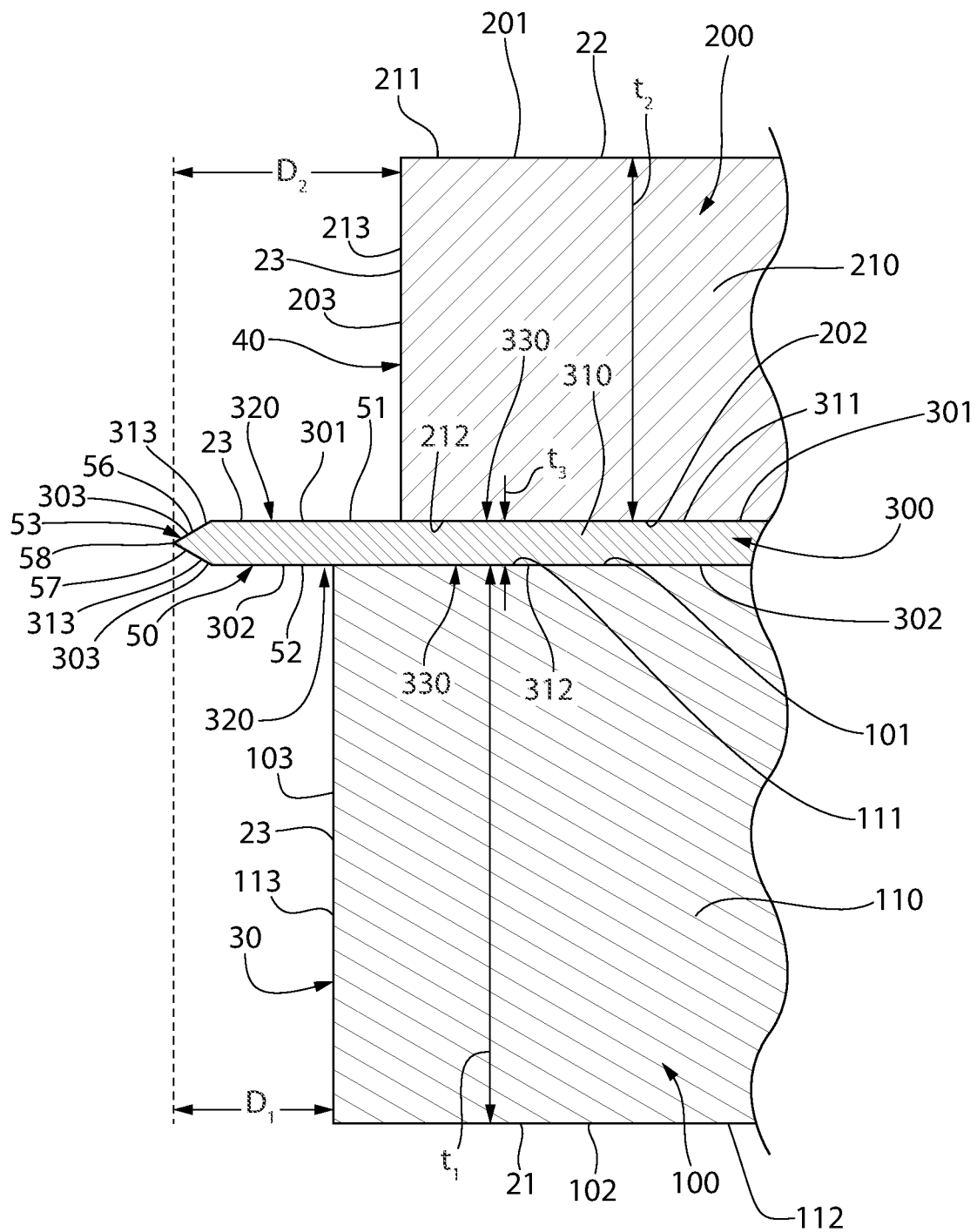
FIG. 7 is a close-up view of region V of the acoustic ceiling panel of FIG. 3.

Referring now to FIGS. 2, 3, and 7, the acoustic ceiling panel may comprise a first exposed major surface 21 opposite a second exposed major surface 22. The acoustic ceiling panel may further comprise an exposed side surface 23 extending between the first exposed major surface 21 and the second exposed major surface 22.

The acoustic ceiling panel 20 may have an overall length and width. In some embodiments, the length of the acoustic building panel 20 may range from 12 inches to 96 inches—including all lengths and sub-ranges there-between. In a non-limiting example, the length of the acoustic building panel may be 12, 18, 24, 30, 48, 60, 72, or 96 inches. In some embodiments, the width of the acoustic building panel 20 may range from 4 to 48 inches—including all widths and sub-ranges there-between. In a non-limiting example, the acoustic building panel 20 may have a width of 4, 6, 12, 18, 20, 24, 30, or 48 inches.

The exposed side surface 23 may comprise a first portion 30, a second portion 40, and a third portion 50. The first portion 30 of the exposed side surface 23 may be located adjacent to the first exposed major surface 21 of the acoustic ceiling panel 20. In some embodiments, the first portion 30 of the exposed side surface 23 may be located immediately adjacent to the first exposed major surface 21 of the acoustic ceiling panel 20. In some embodiments, the first portion 30 of the exposed side surface 23 may be oriented substantially perpendicular to the first exposed major surface 21 of the acoustic ceiling panel 20.

The second portion 40 of the exposed side surface 23 may be located adjacent to the second exposed major surface 22 of the acoustic ceiling panel 20. In some embodiments, the second portion 40 of the exposed side surface 23 may be located immediately adjacent to the second exposed major surface 22 of the acoustic ceiling panel 20. In some embodiments, the second portion 40 of the exposed side surface 23 may be oriented substantially perpendicular to the second exposed major surface 23 of the acoustic ceiling panel 20. The first portion 30 of the exposed side surface 23 may be oriented substantially parallel to the second portion 40 of the exposed side surface 23 of the acoustic ceiling panel 20.

The third portion 50 of the exposed side surface 23 may be located between the first portion 30 and the second portion 40 of the exposed side surface 23. The third portion 50 may comprise an upper side surface 51 opposite a lower side surface 52. The third portion 50 may further comprise an edge 53 extending between the upper side surface 51 and the lower side surface 52. In an unbiased state, the upper side surface 51 of the third portion 50 of the exposed side surface 23 may be substantially parallel to the second exposed major surface 22 of the acoustic ceiling panel. In an unbiased state, the lower side surface 52 of the third portion 50 of the exposed side surface 23 may be substantially parallel to the first exposed major surface 22 of the acoustic ceiling panel.

The term "unbiased state" refers to no external force (other than gravity) being applied to the acoustic ceiling panel. In a non-limiting example, the acoustic ceiling panel 20 may be in an unbiased state as a standalone component before being installed onto the support grid 5.

Additionally, the term "biased state" refers to an external force (other than gravity) being applied to the acoustic ceiling panel. In a non-limiting example, the contact between the acoustic ceiling panel 20 and the support grid 5 may result in a compressive force being applied to the acoustic ceiling panel 20, thereby placing the acoustic ceiling panel into a biased state.

The edge 53 of the third portion 50 may comprise a first edge portion 56 and a second edge portion 57. The first edge portion 56 may extend from the upper side surface 51 of the third portion 50 to the second edge portion 57 of the edge 53 of the third portion 50. In some embodiments, the first edge portion 56 may extend continuously from the upper side surface 51 of the third portion 50 to the second edge portion 57 of the edge 53 of the third portion 50.

The second edge portion 57 may extend from the first edge portion 56 to the lower side surface 52 of the third portion 50 of the exposed side surface 23. In some embodiments, the second edge portion 57 may extend continuously from the first edge portion 56 to the lower side surface 52 of the third portion 50 of the exposed side surface 23.

The first edge portion 56 may be oriented at an angle that is oblique to the upper side surface 51 of the third portion 50 of the exposed side surface 23. The first edge portion 56 may be oriented at an angle that is oblique to the lower side surface 52 of the third portion 50 of the exposed side surface 23. The second edge portion 57 may be oriented at an angle that is oblique to the upper side surface 51 of the third portion 50 of the exposed side surface 23. The second edge portion 57 may be oriented at an angle that is oblique to the lower side surface 52 of the third portion 50 of the exposed side surface 23. The first edge portion 56 and the second edge portion 57 may intersect at an apex 58.

The third portion 50 of the exposed side surface 23 of the acoustic building panel 20 may extend outward beyond the first portion 30 of the exposed side surface 23. In some embodiments, the third portion 50 of the exposed side surface 23 of the acoustic building panel 20 may extend outward beyond the first portion 30 of the exposed side surface 23 to a first distance $D_1$, which is a positive, non-zero value. The first distance $D_1$ may be measured by the distance between the first portion 30 of the exposed side surface 23 and the apex 58 of the edge 53 of the third portion 50 of the exposed side surface 23.

In a non-limiting embodiment, the first distance $D_1$ may range from about 0.2" to about 1.0"—including all distances and sub-ranges there-between. In some embodiments, the first distance $D_1$ may range from about 0.2" to about 0.5"—including all distances and sub-ranges there-between. In a non-limiting embodiment, the first distance $D_1$ may range from about 0.2" to about 0.3"—including all distances and sub-ranges there-between. In some embodiments, the first distance $D_1$ may be about 0.25".

The third portion 50 of the exposed side surface 23 of the acoustic building panel 20 may extend outward beyond the second portion 40 of the exposed side surface 23. In some embodiments, the third portion 50 of the exposed side surface 23 of the acoustic building panel 20 may extend outward beyond the second portion 40 of the exposed side surface 23 to a second distance $D_2$, which is a positive, non-zero value. The second distance $D_2$ may be measured by the distance between the second portion 40 of the exposed side surface 23 and the apex 58 of the edge 53 of the third portion 50 of the exposed side surface 23.

In a non-limiting embodiment, the second distance $D_2$ may range from about 0.5" to about 2.0"—including all distances and sub-ranges there-between. In some embodiments, the second distance $D_2$ may range from about 0.5" to about 1.5"—including all distances and sub-ranges there-between. In a non-limiting embodiment, the second distance $D_2$ may range from about 0.7" to about 1.3"—including all distances and sub-ranges there-between. In some embodiments, the second distance $D_2$ may be about 1.0".

An edge distance ratio may exist between the second distance $D_2$ and the first distance $D_1$—whereby the edge distance ratio ranges from about 2:1 to about 6:1—including all ratios and sub-ranges there-between. In some embodiments, the edge distance may range from about 3:1 to about 5:1—including all ratios and sub-ranges there-between. In some embodiments, the edge distance may be about 4:1.

Referring now to FIGS. 2-4, 6, and 7, the acoustic ceiling panel 20 may comprise a first layer 100, a second layer 200, and a third layer 300. The first layer 100 may comprise a first major surface 101 opposite a second major surface 102. The first layer 100 may comprise a side surface 103 that extends between the first major surface 101 and the second major surface 102 of the first layer 100.

The side surface 103 of the first layer 100 may define a first perimeter $P_1$ of the first layer 100. In some embodiments, the side surface 103 of the first layer 100 may define a first perimeter $P_1$ of the first major surface 101 of the first layer 100.

The first layer 100 may have a first thickness $t_1$ as measured by the distance between the first major surface 101 and the second major surface 102 of the first layer 100. The first thickness $t_1$ may range from about 0.25" to about 3.0"—including all thickness and sub-ranges there-between. In some embodiments, the first thickness $t_1$ may range from about 0.5" to about 1.5"—including all thickness and sub-ranges there-between. In some embodiments, the first thickness $t_1$ may range from about 0.75" to about 1.0"—including all thickness and sub-ranges there-between.

The first layer 100 may have a first length $L_1$ and a first width $W_1$. The first length $L_1$ may be substantially equal to the overall length of the acoustic ceiling panel 20. In some embodiments, the first length $L_1$ may be about 95% of the overall length of the acoustic ceiling panel 20. In some embodiments, the first length $L_1$ may be about 98% of the overall length of the acoustic ceiling panel 20. In some embodiments, the first length $L_1$ may be about 99% of the overall length of the acoustic ceiling panel 20.

The first width $W_1$ may be substantially equal to the overall width of the acoustic ceiling panel 20. In some embodiments, the first width $W_1$ may be about 95% of the overall width of the acoustic ceiling panel 20. In some embodiments, the first width $W_1$ may be about 98% of the overall width of the acoustic ceiling panel 20. In some embodiments, the first width $W_1$ may be about 99% of the overall width of the acoustic ceiling panel 20.

The first major surface 101 of the first layer 100 may comprise a first surface area as measured by the area defined by the first width $W_1$ and the first length $L_1$ of the first layer 100.

The first layer 100 may comprise a first body 110. The first body 110 may comprise an upper surface 111 opposite a lower surface 112 and a side surface 113 extending between the upper surface 111 and the lower surface 112. The first body 110 may be an air-permeable body.

In some embodiments, the first layer 100 may comprise a coating applied to one or more of the surfaces of the first body 110. In a non-limiting example, a paint may be applied to at least one of the lower surface 112 of the first body 110 and/or the side surface lower surface 112 of the first body 110. In such embodiments, the second exposed surface 102 of the first layer 100 may be formed by coating (e.g., paint) applied to the lower surface 112 of the first body 110. In such embodiments, the side surface 103 of the first layer 100 may be formed by the coating (e.g., paint) applied to the side surface 113 of the first body 110. In such embodiments, the first major surface 101 of the first layer 100 may be formed by the upper surface 111 of the first body 110.

In other embodiments, a non-woven scrim may be attached to the lower surface 112 of the body 110. In such embodiments, the second exposed surface 102 of the first layer 100 may be formed by the non-woven scrim attached to the lower surface 112 of the first body 110.

The first body 100 may be porous, thereby resulting in the air-permeable nature of the first body 100. The term "porous structure" refers to the first body 100 comprising a plurality of open pathways that extend between the upper surface 111, the lower surface 112, and the side surface 113 on the first body 110.

As discussed further herein, the open pathways are open voids within the first body 100 that allow for airflow into between the upper surface 110, the lower surface 111, and/or the side surface 113. The open pathways may be considered to create fluid communication between various points within the first body 100. As a result, the first layer 100, which is formed at least in part by the first body 110, is also air-permeable. The first layer 100 may be air-permeable even with a coating and/or non-woven scrim previously applied.

As discussed, the first body 110 may be porous and allow for sufficient airflow via the open pathways such that the resulting first layer 100 can reduce the amount of reflected sound in a room environment 2. Specifically, air may enter at least one of the plurality of openings present on the first body 110 and flow throughout the open pathways within the first body 110, thereby helping dissipate noise from the room environment 2.

The reduction in amount of reflected sound in a room is expressed by a Noise Reduction Coefficient (NRC) rating as described in American Society for Testing and Materials (ASTM) test method C423. This rating is the average of sound absorption coefficients at four ⅓ octave bands (250, 500, 1000, and 2000 Hz), where, for example, a system having an NRC of 0.90 has about 90% of the absorbing ability of an ideal absorber. A higher NRC value indicates that the material provides better sound absorption and reduced sound reflection.

The resulting first layer 100 may exhibits an NRC of at least about 0.5. In a preferred embodiment, the first layer 100 may have an NRC ranging from about 0.60 to about 0.99—including all value and sub-ranges there-between. Non-limiting examples of NRC value for the first layer 100 include 0.65, 0.7, 0.75, 0.8, 0.85, 0.9, 0.95.

The first layer 100 may have a first airflow resistance ($R_1$) that is measured at the second major surface 101 (or the first major surface 101). Airflow resistance is a measured by the following formula:

$$R = (P_A - P_{ATM})/\dot{V}$$

Where R is air flow resistance (measured in ohms); $P_A$ is the applied air pressure; $P_{ATM}$ is atmospheric air pressure (Pa); and $\dot{V}$ is volumetric airflow (m³/s). The first airflow resistance ($R_1$) of the first layer 100 may range from about 0.5 ohm to about 50 ohms. In a preferred embodiment, the airflow resistance of the first layer 100 may range from about 0.5 ohms to about 35 ohms.

The first body 100 may comprise a fibrous material. The first body 110 may comprise a filler. The first body 110 may comprise a binder.

The fibrous material may comprise an organic fiber. The fibrous material may comprise an inorganic fiber. Non-limiting examples of inorganic fiber include fiberglass, mineral wool (also referred to as slag wool), rock wool, stone wool, and glass fibers (fiberglass). Non-limiting examples of organic fiber include cellulosic fibers (e.g. paper fiber—such as newspaper, hemp fiber, jute fiber, flax fiber, wood fiber, or other natural fibers), polymer fibers (including polyester, polyethylene, aramid—i.e., aromatic polyamide, and/or polypropylene), protein fibers (e.g., sheep wool), and combinations thereof. Depending on the specific type of material, the fibrous material may either be hydrophilic (e.g., cellulosic fibers) or hydrophobic (e.g. fiberglass, mineral wool, rock wool, stone wool). The fibrous material may be present in an amount ranging from about 5 wt. % to about 99 wt. % based on the total dry weight of the first body 110—including all values and sub-ranges there-between.

The phrase "dry-weight" refers to the weight of a referenced component without the weight of any carrier. Thus, when calculating the weight percentages of components in the dry-state, the calculation should be based solely on the solid components (e.g., binder, filler, fibrous material, etc.) and should exclude any amount of residual carrier (e.g., water, VOC solvent) that may still be present from a wet-state, which will be discussed further herein. According to the present invention, the phrase "dry-state" may also be used to indicate a component that is substantially free of a carrier, as compared to the term "wet-state," which refers to that component still containing various amounts of carrier—as discussed further herein. The dry-state may refer to the coatings having a solids content of at least about 99 wt. % based on the total weight of the coating—such amount may allow for minor amounts (up to about 1 wt. %) of residual liquid carrier that may be present in the coating after drying.

Non-limiting examples of binder may include a starch-based polymer, polyvinyl alcohol (PVOH), a latex, polysaccharide polymers, cellulosic polymers, protein solution polymers, an acrylic polymer, polymaleic anhydride, polyvinyl acetate, epoxy resins, or a combination of two or more thereof. The binder may be present in an amount ranging from about 1.0 wt. % to about 25.0 wt. % based on the total dry weight of the first body 110—including all percentages and sub-ranges there-between. In a preferred embodiment, the binder may be present in an amount ranging from about 3.0 wt. % to about 10.0 wt. % based on the total dry weight of the first body 110—including all percentages and sub-ranges there-between.

Non-limiting examples of filler may include powders of calcium carbonate, including limestone, titanium dioxide, sand, barium sulfate, clay, mica, dolomite, silica, talc, perlite, polymers, gypsum, wollastonite, expanded-perlite, calcite, aluminum trihydrate, pigments, zinc oxide, or zinc sulfate. The filler may be present in an amount ranging from about 0 wt. % to about 80 wt. % based on the total dry weight of the first body 110—including all values and sub-ranges there-between. In other embodiments, the filler may be present in an amount ranging from about 5 wt. % to about 70 wt. % based on the total dry weight of the first body 110—including all values and sub-ranges there-between.

In non-limiting embodiments, the first body 110 may further comprise one or more additives include defoamers, wetting agents, biocides, dispersing agents, flame retardants (such as alumina tri-hydrate), and the like. The additive may be present in an amount ranging from about 0.01 wt. % to about 30 wt. % based on the total dry weight of the first body 110—including all values and sub-ranges there-between.

The first body 110 may have a first density ranging from about 2 lb/ft$^3$ to about 16 lb/ft$^3$—including all densities and sub-ranges there-between. In a preferred, embodiment the first body 110 may have a first density ranging from about 5 lb/ft$^3$ to about 14 lb/ft$^3$—including all densities and sub-ranges there-between. The first body 110 may have a first rigidity.

The first body 110 may have a porosity ranging from about 60% to about 98%—including all values and sub-ranges there between. In a preferred embodiment, the first body 110 may have a porosity ranging from about 75% to 95%—including all values and sub-ranges there between. According to the present invention, porosity refers to the following:

$$\% \text{ Porosity} = [V_{Total} - (V_{Binder} + V_{Fibers} + V_{Filler})]/V_{Total}$$

Where $V_{Total}$ refers to the total volume of the first body 110 as defined by the upper surface 110, the lower surface 111, and the side surface 113. $V_{Binder}$ refers to the total volume occupied by the binder in the first body 110. $V_{Fibers}$ refers to the total volume occupied by the fibrous material in the first body 110. $V_{Filler}$ refers to the total volume occupied by the filler in the first body 110. Thus, the % porosity represents the amount of free volume within the first body 110—whereby the free volume forms the open pathways of the first body 110. Thus, as porosity increases, the resulting airflow resistance of the first air-permeable body 100 decreases and NRC value increases.

The second layer 200 may comprise a first major surface 201 opposite a second major surface 202. The second layer 200 may comprise a side surface 203 that extends between the first major surface 201 and the second major surface 202 of the second layer 200.

The side surface 203 of the second layer 200 may define a second perimeter $P_2$ of the second layer 200. In some embodiments, the side surface 203 of the second layer 200 may define a second perimeter $P_2$ of the second major surface 202 of the second layer 200.

The second layer 200 may have a second thickness $t_2$ as measured by the distance between the first major surface 201 and the second major surface 202 of the second layer 200. The second thickness $t_2$ may range from about 0.125" to about 2.0"—including all thickness and sub-ranges there-between. In some embodiments, the second thickness $t_2$ may range from about 0.25" to about 1.5"—including all thickness and sub-ranges there-between. In some embodiments, the second thickness $t_2$ may range from about 0.5" to about 0.75"—including all thickness and sub-ranges there-between.

The second layer 200 may have a second length $L_2$ and a second width $W_2$. The second length $L_2$ may be substantially equal to the overall length of the acoustic ceiling panel 20. In some embodiments, the second length $L_2$ may be about 94% of the overall length of the acoustic ceiling panel 20. In some embodiments, the second length $L_2$ may be about 95% of the overall length of the acoustic ceiling panel 20.

The second width $W_2$ may be substantially equal to the overall width of the acoustic ceiling panel 20. In some embodiments, the second width $W_2$ may be about 94% of the overall width of the acoustic ceiling panel 20. In some embodiments, the second width $W_2$ may be about 95% of the overall width of the acoustic ceiling panel 20.

The second major surface 202 of the second layer 200 may comprise a second surface area as measured by the area defined by the second width $W_2$ and the second length $L_2$ of the second layer 100.

The second layer 200 may comprise a second body 210. The second body 210 may comprise an upper surface 211 opposite a lower surface 212 and a side surface 213 extending between the upper surface 211 and the lower surface 212 of the second layer 200. The second body 210 may be an sound-attenuating body.

The second body 210 may be referred to as an "attenuation body" or an "attenuation layer." In some embodiments the second body 210 may be formed of a material selected from fiberglass, mineral wool (such as rock wool, slag wool, or a combination thereof), synthetic polymers (such as melamine foam, polyurethane foam, or a combination thereof), mineral cotton, silicate cotton, gypsum, or combinations thereof. In some embodiments, the second body 210 may predominantly provide a sound attenuation function and preferred materials for providing the sound attenuation function for the second layer 200. In some embodiments the second body 210 may be produced from gypsum board, cement board, granite, and ceramic board.

The second body 210 may have a second density ranging from about 16 lb/ft$^3$ to about 180 lb/ft$^3$—including all densities and sub-ranges there-between. In a preferred embodiment, the second body 210 may have a second density ranging from about 25 lb/ft$^3$ to about 100 lb/ft$^3$—including all densities and sub-ranges there-between. A ratio of the second density to the first density of the first body 110 may range from about 1.5:1 to about 10:1—including all densities and sub-ranges there-between. In a preferred embodiment, the ratio of the second density to the first density may be at least 2:1, preferably 3:1. In some embodiments, the ratio of the second density to the first density may be about 4:1. In some embodiments, the ratio of the second density to the first density may range from about 1.5:1 to about 2:1.

The ceiling panel 20 comprising the second layer 200 formed of the second body 210, when installed in a ceiling system 1, may result in a ceiling system 1 that exhibits a CAC value ranging from about 35 dB, preferably at least 37 dB, preferably at least 40 dB. The second body 210 may have a second rigidity. The second rigidity may be greater than the first rigidity. In some embodiments, the first rigidity of the first layer 100 and the second rigidity of the second layer 200 are equal.

The third layer 300 may comprise a first major surface 301 opposite a second major surface 302. The third layer 300 may comprise a side surface 303 that extends between the first major surface 301 and the second major surface 302 of the third layer 300.

The third layer 300 may have a third thickness $t_3$ as measured by the distance between the first major surface 301 and the second major surface 302 of the third layer 300. The third thickness $t_3$ may range from about 0.015" to about 1.0"—including all thickness and sub-ranges there-between. In some embodiments, the third thickness $t_3$ may range from about 0.030" to about 0.25"—including all thickness and sub-ranges there-between. In some embodiments, the third thickness $t_3$ may range from about 0.04" to about 0.125"—including all thickness and sub-ranges there-between. In some embodiments, the third thickness $t_3$ may be about 0.625".

The third layer 300 may have a third length $L_3$ and a third width $W_3$. The third length $L_3$ may be substantially equal to the overall length of the acoustic ceiling panel 20. In some embodiments, the third length $L_3$ may be about 99% to 100% of the overall length of the acoustic ceiling panel 20.

The third width $W_3$ may be substantially equal to the overall width of the acoustic ceiling panel 20. In some embodiments, the third width $W_3$ may be about 99% to about 100% of the overall width of the acoustic ceiling panel 20.

Each of the first major surface 301 and the second major surface 302 of the third layer 300 may have a third surface area as measured by the area defined by the third width $W_3$ and the third length $L_3$ of the third layer 300. In some embodiments, the third surface area of the first major surface 301 of the third layer 300 may be substantially equal to the third surface area of the second major surface 302 of the third layer 300.

The third layer 300 may comprise a third body 310. The third body 310 may comprise an upper surface 311 opposite a lower surface 312 and a side surface 313 extending between the upper surface 311 and the lower surface 312 of the third layer 300. The third body 310 may be an air-impermeable film.

The side surface 303 of the third layer 300 may define a third perimeter $P_3$ of the third layer 300. In some embodiments, the side surface 303 of the third layer 300 may define a third perimeter $P_3$ of the first major surface 301 of the third layer 300. In some embodiments, the side surface 303 of the third layer 300 may define a third perimeter $P_3$ of the second major surface 302 of the third layer 300.

The third layer 300 may comprise a perimeter region 320 immediately adjacent to the third perimeter $P_3$ of the third layer 300. The perimeter region 320 may be present on at least one of the first major surface 301 and/or the second major surface 302 of the third layer. The third layer 300 may further comprise a central region 330 that is circumscribed by the perimeter region 320. In relation to the perimeter region 320, the central region 330 may be present on at least one of the first major surface 301 and/or the second major surface 302 of the third layer.

The third body 310 may be referred to as an "air-resistive film" or an "air-resistive gasket." In some embodiments the third body 310 may be formed of air-resistive materials, also referred to as a "gasket material" that may be selected from polymeric materials, metallic materials, and combinations thereof. As discussed in greater detail, the third body 310 and resulting third layer 300 may result in the ceiling panel 20 forming a gasket seal with the ceiling grid 5. With the third layer 300 being capable for forming a gasket seal with the ceiling grid 5, the third layer 300 may also be referred to as a "sealing layer."

Non-limiting examples of polymeric material include vinyl polymer, silicone polymer, acrylic polymer, as well as polymers of acrylonitrile, acrylonitrile butadiene rubber, fluoro-polymers, hydrogenated acrylonitrile butadiene rubber, styrene butadiene polymer, fluoroelastomer polymer, acrylic-acrylonitrile polymers, carboxylated acrylonitrile polymer, carboxylated styrene butadiene polymer, polyvinylidene chloride, chloroprene rubber polymer, ethylene propylene rubber polymer, ethylene/vinyl acetate polymer, epoxy, fluorosilicones, polyurethane, and silicone rubber coatings and mixtures thereof.

In some embodiments, the third layer 300 may comprise a third body 310 that is formed entirely of polymeric material. The third body 310 formed of polymeric material may be flexible. The third body 310 may be a film formed of the polymeric material. The film may be cast or extruded. The third body 310 may be a foam body formed of the polymeric material. The foam may be closed cell. The foam body may be cast in a mold. The foam body may be cut to shape from a stock of material.

In some embodiments, the third layer 300 may comprise a metallic third body 310, whereby a polymeric material may be affixed to the side surfaces 313 of the third body 310, whereby the polymeric material forms the side surfaces 303 of the third layer 300, which forms the gasket seal with the ceiling grid 5. The third body 310 formed of metallic material may be flexible.

The third body 310 may have a third density ranging from about 4 lb/ft$^3$ to about 105 lb/ft$^3$—including all densities and sub-ranges there-between. In some embodiments, the third body 310 may have a third density ranging from about 65 lb/ft$^3$ to about 77 lb/ft$^3$—including all densities and sub-ranges there-between. In some embodiments, the third body 310 may comprise closed cell foam having a third density ranging from about 3 lb/ft$^3$ to about 6 lb/ft$^3$—preferably about 4 lb/ft$^3$ to about 5 lb/ft$^3$—including all densities and subranges there-between. In some embodiments, the third body 310 may comprise mass-loaded vinyl polymer having a third density ranging from about 90 lb/ft$^3$ to about 110 lb/ft$^3$—preferably about 95 lb/ft$^3$ to about 105 lb/ft$^3$—including all densities and subranges there-between.

A ratio of the third density to the first density may range from about 0.25:1 to about 53:1—including all densities and sub-ranges there-between. A ratio of the third density to the second density may range from about 0.002:1 to about 18:1—including all densities and sub-ranges there-between.

The third body 310 may exhibit an airflow resistance ranging from about 2 cgs acoustic ohm to about 200 cgs acoustic ohms—including all resistance values and sub-ranges there-between. The third layer 300 may exhibit an airflow resistance ranging from about 2 cgs acoustic ohm to about 200 cgs acoustic ohms—including all resistance values and sub-ranges there-between.

The third body 310 may have a third rigidity. The first rigidity may be greater than the third rigidity. The second rigidity may be greater than the third rigidity. The third body 310 may be flexible. The term "flexible" refers to a material capable of reversibly deforming when an external force is applied there-to. The third layer 300 may be flexible.

The third body 310 may be formed of a material allowing the third body 310 to be conformable. The term "conformable" refers to the third body occupying a first volume in a non-biased state, wherein the third body 310 can be compressed (i.e., biased-state) to occupy a second volume—thereby causing the third body 310 to conform to the shape of the second volume. The second volume may either be smaller than the first volume. In other embodiments, the second volume may be equal to the first volume but may occupy a different geometry than the first volume.

In a non-limiting embodiment, the third body 310 may be formed by casting a polymeric film to the third thickness $t_3$—whereby the film may be cut into the final dimensions of the third length $L_3$ and third width $W_3$. In a non-limiting embodiment, the third body 310 may be formed by extruding a polymeric film to the third thickness $t_3$—whereby the film may be cut into the final dimensions of the third length $L_3$ and third width $W_3$. In a non-limiting embodiment, the third body 310 may be formed by rolling a metallic sheet to the third thickness $t_3$—whereby the film may be cut into the final dimensions of the third length $L_3$ and third width $W_3$.

In some embodiments, the third layer 300 may extend continuously across the first and second major surfaces 301, 302. In such embodiments, the third body 310 may extend continuously across the upper surface 311 and the lower surface 312 to form a continuous air-impermeable barrier.

The third surface area may be greater than the first surface area. The third surface area may be greater than the second surface area. The first surface area may be greater than the second surface area.

A first ratio of the third surface area to the first surface area may range from about 1.02:1 to about 1.03:1—including all ratios and sub-ranges there-between. A second ratio of the third surface area to the second surface area may range from about 1.08:1 to about 1.1:1—including all ratios and sub-ranges there-between. A third ratio of the first surface area to the second surface area may range from about 1.06:1 to about 1.07:1—including all ratios and sub-ranges there-between.

Although not shown, in some embodiments the third layer 300 may extend dis-continuously across the first and second major surfaces 301, 302. In such embodiments, the third body 310 may extend dis-continuously across the upper surface 311 and the lower surface 312 to form a continuous air-impermeable barrier.

In a non-limiting example, the third layer 300 may extend discontinuously across the first and second major surfaces 301, 302 such that one or more apertures extends from the first major surface 301 to the second major surface 302 of the third layer 300. The apertures may occupy about 1% to about 99% of the first and second major surfaces 301, 302 present in the central region 330 of the third layer 300. In such embodiments, the perimeter region 320 may extend continuously about the central region 330 to create an enclosed perimeter of the central region 330, which contains one or more apertures.

In such embodiments, at least a portion of the first major surface 101 of the first layer 100 may directly face at least a portion of the second major surface 202 of the second layer 200 where the one or more apertures of the third layer 300 overlap the first and second layers 200. Depending on the thickness of the third layer 300, in some embodiments, at least a portion of the first major surface 101 of the first layer 100 may be in free-floating contact with at least a portion of the second major surface 202 of the second layer 200 where the one or more apertures of the third layer 300 overlap the first and second layers 200.

In a non-limiting example, the third layer 300 may be in the shape of a frame—whereby the perimeter region 320 and at least a portion of the central region 330 make up a perimeter of the frame and a central opening is located inset and circumscribed by the perimeter of the frame—whereby the central opening extends from the first major surface 301 to the second major surface 302 of the third layer 300.

The ceiling panel 20 of the present invention may be formed by the third layer 300 (i.e., the sealing layer) positioned between the first layer 100 and the second layer 200. In particular, the third layer 300 may be positioned between the first major surface 101 of the first layer 100 and the second major surface 202 of the second layer 200. In such embodiment, the side surface 303 of the third layer 300 may extend laterally outwards beyond the side surface 103 of the first layer 100. In such embodiment, the side surface 303 of the third layer 300 may extend laterally outwards beyond the side surface 203 of the second layer 200. In such embodiment, the side surface 303 of the third layer 300 may extend laterally outwards beyond both of the side surface 103 of the first layer 100 and the side surface 203 of the second layer 200.

The central region 330 located on the first major surface 301 of the third layer 300 may at least partially overlap with the second major surface 202 of the second layer 200. In some embodiments, the central region 330 located on the first major surface 301 of the third layer 300 may overlap with the entirety of the second major surface 202 of the second layer 200.

The perimeter region 320 located on the first major surface 301 of the third layer 300 may not fully overlap with the second major surface 202 of the second layer 200. In some embodiments, the perimeter region 320 located on the first major surface 301 of the third layer 300 may not overlap at all with the entirety of the second major surface 202 of the second layer 200.

The central region 330 located on the second major surface 302 of the third layer 300 may at least partially overlap with the first major surface 101 of the first layer 100. In some embodiments, the central region 330 located on the second major surface 302 of the third layer 300 may overlap with the entirety of the first major surface 101 of the first layer 100.

The perimeter region 320 located on the second major surface 302 of the third layer 300 may not fully overlap with the first major surface 101 of the first layer 100. In some embodiments, the perimeter region 320 located on the second major surface 302 of the third layer 300 may not overlap at all the first major surface 101 of the first layer 100.

According to some embodiments, the ceiling panel 20 of the present invention may include the central region 330 of the third layer 300 being located between the first layer 100 and the second layer 200 such that the central region 330 overlaps with the first major surface 101 of the first layer 100 and the second major surface 202 of the second layer 200, whereby at least a portion of the perimeter region 320 of the third layer does not overlap with either of the first layer 100 or the second layer 200—specifically, wherein at least a portion of the perimeter region 320 of the third layer does not overlap with either of the first major surface 101 of the first layer 100 or the second major surface 202 of the second layer 200.

Figure 11:
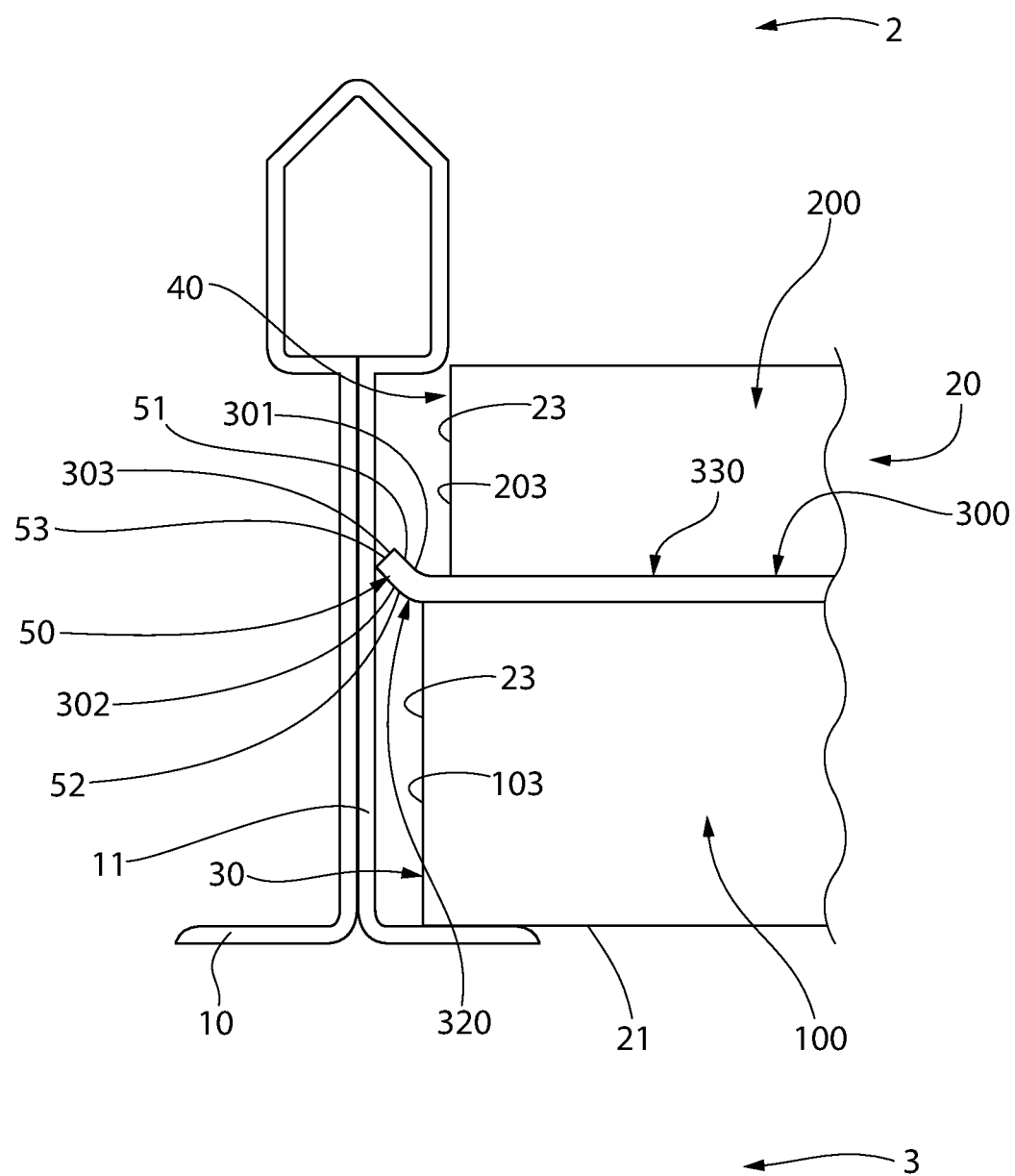
FIG. 11 is a close-up view of the acoustic ceiling panel of FIG. 9 installed into the ceiling system of the present disclosure.
Figure 12:
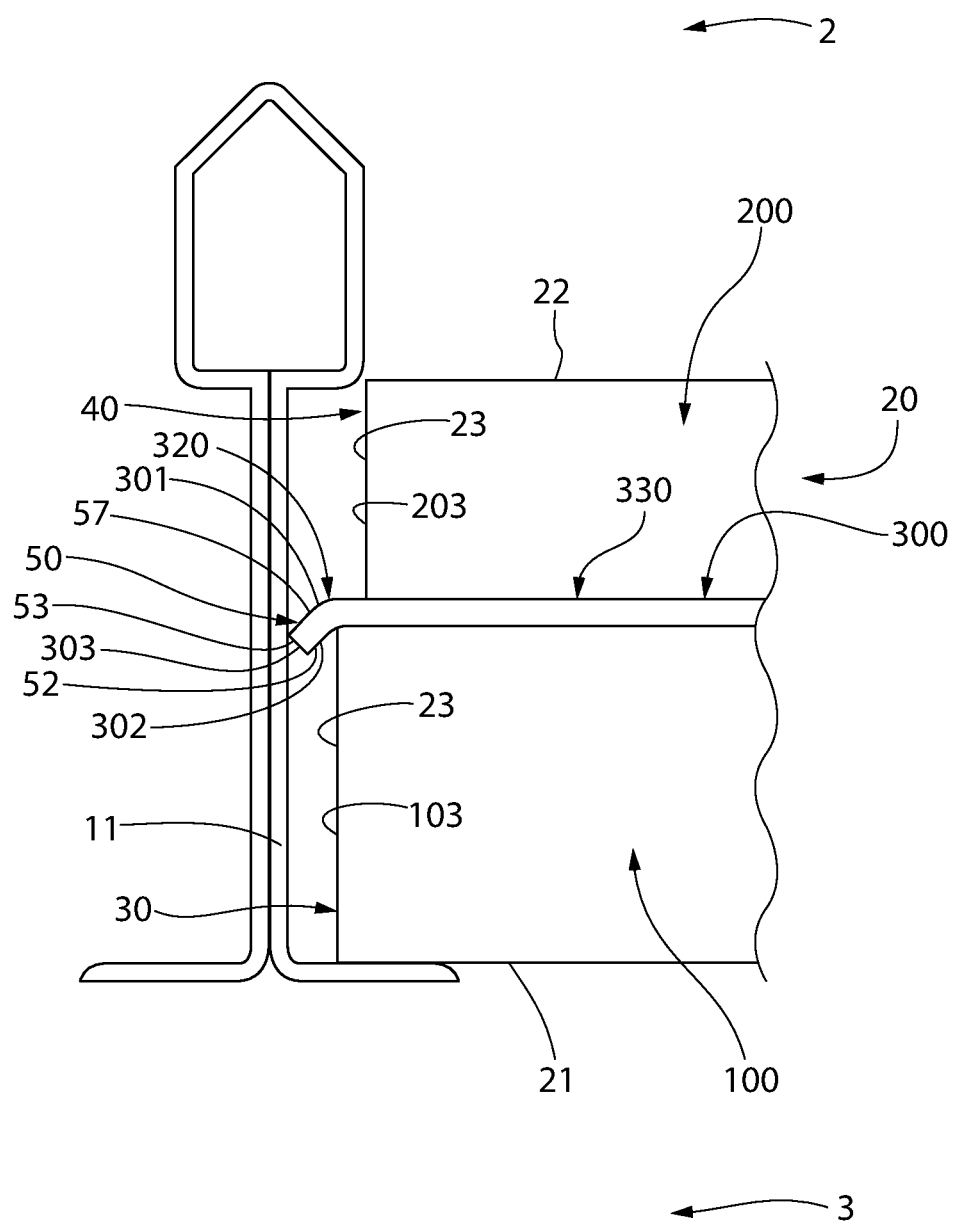
FIG. 12 is a close-up view of the acoustic ceiling panel of FIG. 9 installed into the ceiling system of the present disclosure.

Referring now to FIGS. 11 and 12, the perimeter region 320 of the third layer 300 may be capable of flexing in at least one upward or downward direction relative to the central region 330. According to such embodiments, the perimeter region 320 of the third layer 300 may be capable of flexing upward and downward relative to the first layer 100 of the ceiling panel 20. According to such embodiments, the perimeter region 320 of the third layer 300 may be capable of flexing upward and downward relative to the second layer 200 of the ceiling panel 20. According to such embodiments, the perimeter region 320 of the third layer 300 may be capable of flexing upward and downward relative to the central region 330 of the third layer 300 of the ceiling panel 20. According to such embodiments, the perimeter region 320 of the third layer 300 may be capable of flexing upward and downward relative to the first layer 100, the second layer 200, and the central region 330 of the ceiling panel 20.

In some embodiments, the perimeter region 320 of the third layer 300 may be capable of flexing downward so as to contact the side surface 103 of the first layer 100. The perimeter region 320 may be flexed downward into the biased state. In some embodiments, the perimeter region 320 of the third layer 300 may be capable of flexing upward so as to contact the side surface 203 of the second layer 200. The perimeter region 320 may be flexed upward into the biased state. In some embodiments, the perimeter region 320 of the third layer 300 may be capable of flexing upward and/or downward so as to contact at least one of the side surface 103 of the first layer 100 and/or the side surface 203 of the second layer 200. The perimeter region 320 may be flexed downward and/or upward into the biased state.

According to some embodiments of the present invention, the third portion 50 of the exposed side surface 23 of the ceiling panel 20 may be formed by the third perimeter $P_3$ and the perimeter portion 320 of the third layer 300. Specifically, the upper side surface 51 of the third portion 50 of the exposed side surface 23 may be formed by the perimeter region 320 present on the first major surface 301 of the third layer 300. Specifically, the lower side surface 52 of the third portion 50 of the exposed side surface 23 may be formed by the perimeter region 320 present on the second major surface 302 of the third layer 300. Specifically, the edge 53 of the third portion 50 of the exposed side surface 23 may be formed by the third perimeter $P_3$ formed by the side surface 303 of the third layer 300.

The perimeter region 320 of the third layer 300 may be remain exposed in the ceiling panel 20. Thus, the perimeter region 320 and the side surface 303 of the third layer 300 may form the third portion 50 of the exposed side surface 23 of the ceiling panel 20.

According to some embodiments of the present invention, the perimeter region 320 present on the first major surface 301 of the third layer 300 may extend inward from the third perimeter $P_3$ to the central region 330 by a distance that is substantially equal to the first distance $D_1$, as measured between the first portion 30 of the exposed side surface 23 and the apex 58 of the edge 53 of the third portion 50 of the exposed side surface 23.

The side surface 303 of the third layer 300 may comprise the first edge portion 56, the second edge portion 57, and the apex 58 of the edge 53 of the third portion 50 of the exposed side surface 23 of the ceiling panel 20. According to some embodiments of the present invention, the perimeter region 320 present on the second major surface 302 of the third layer 300 may extend inward from the third perimeter $P_3$ to the central region 330 by a distance that is substantially equal to the second distance $D_2$, as measured between the second portion 40 of the exposed side surface 23 and the apex 58 of the edge 53 of the third portion 50 of the exposed side surface 23.

Referring now to FIGS. 1, 5, and 6, the ceiling system 1 comprises at least one ceiling panel 20 positioned within a grid opening 8 formed by the support grid 5. When positioned in a grid opening 8, the third layer 300 of the ceiling panel 20 may contact the vertical web 11 of at least one of the plurality of first members 6 that defines the respective grid opening 8. When positioned in a grid opening 8, the third layer 300 of the ceiling panel 20 may contact the vertical web 11 of at least one of the plurality of second members 7 that defines the respective grid opening 8. In some embodiments, when positioned in a grid opening 8, the third layer 300 of the ceiling panel 20 may contact the vertical web 11 of at least one of the plurality of first members 6 and at least one of the plurality of second members 7 that defines the respective grid opening 8.

For a ceiling panel 20 positioned within a grid opening 8, a third distance $D_3$ may be measured by the distance between the first portion 30 of the exposed side surface 23 and the vertical web 11 of the respective first member 6 or second member 7. For a ceiling panel 20 positioned within a grid opening 8, a fourth distance $D_4$ may be measured by the distance between the second portion 40 of the exposed side surface 23 and the vertical web 11 of the respective first member 6 or second member 7.

In some embodiments, the first distance $D_1$ may be substantially equal to the third distance $D_3$. In some embodiments, the first distance $D_1$ is greater than the third distance $D_3$. In some embodiments, the second distance $D_2$ may be substantially equal to the fourth distance $D_4$. In some embodiments, the second distance $D_2$ is greater than the fourth distance $D_4$.

The perimeter portion 320 of the third layer 300 (and the respective third portion 50 of the exposed side surface 23 of the ceiling panel 20) may be in contact with the vertical web 11 to the perimeter portion 320 of the third layer 300 (and the respective third portion 50 of the exposed side surface 23 of the ceiling panel 20).

According to some embodiments, the perimeter portion 320 of the third layer 300 (and the respective third portion 50 of the exposed side surface 23 of the ceiling panel 20) may be in a compressed or biased state by the compressive force applied by the vertical web 11 to the perimeter portion 320 of the third layer 300 (and the respective third portion 50 of the exposed side surface 23 of the ceiling panel 20). In such biased-state, the perimeter portion 320 of the third layer 300 (and the respective third portion 50 of the exposed side surface 23 of the ceiling panel 20) may be flexed upward—as shown in FIG. 11—or flexed downward—as shown in FIG. 12. In the compressed or biased state, the third layer 300 may conform to the volume available in the grid opening 8 of the ceiling grid 5.

The contact formed between the perimeter portion 320 of the third layer 300 (and the third portion of the exposed side surface 23 of the ceiling panel 20) may form an air-barrier thereby sealing the active room environment 3 from the plenary space 2. The additional air-barrier formed by the contact between the vertical web 11 and the perimeter portion 320 of the third layer 300 (and the respective third portion 50 of the exposed side surface 23 of the ceiling panel 20) further improves the sound attenuation performance of the overall ceiling system. Moreover, the configuration of the perimeter portion 320 of the third layer 300 (and the third portion of the exposed side surface 23 of the ceiling panel 20) allows for imperfect positioning of the ceiling panel 2 within the grid opening 8 while still achieving a proper air-barrier seal between the ceiling panel 20 and the surround first and/or second support members 6, 7.

Figure 8:
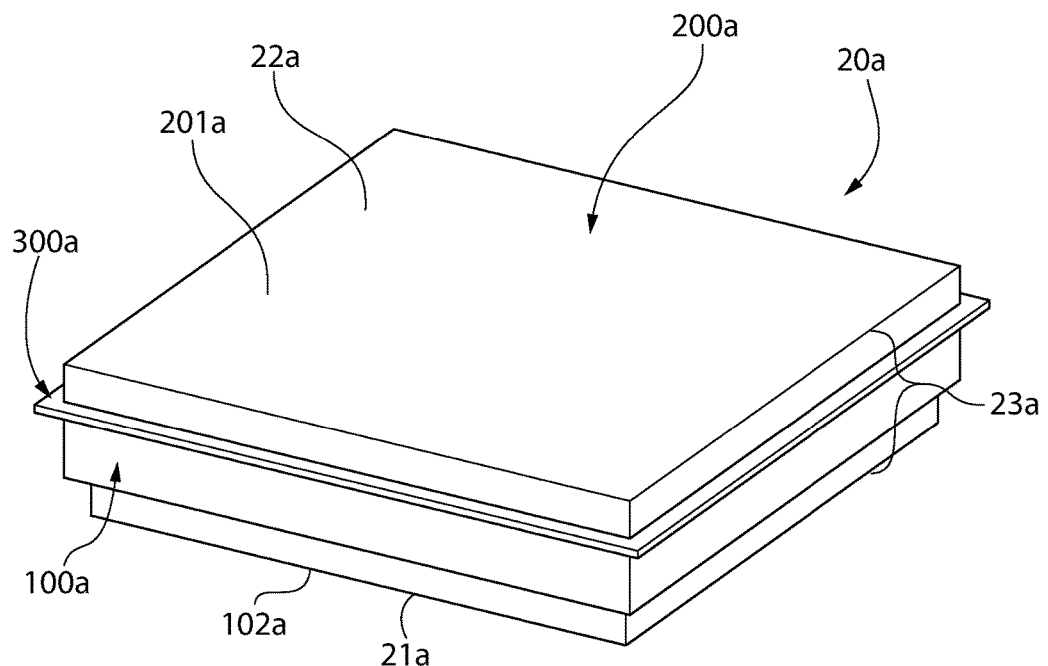
FIG. 8 is a perspective view of an acoustic ceiling panel according to another embodiment of the present disclosure.
Figure 9:
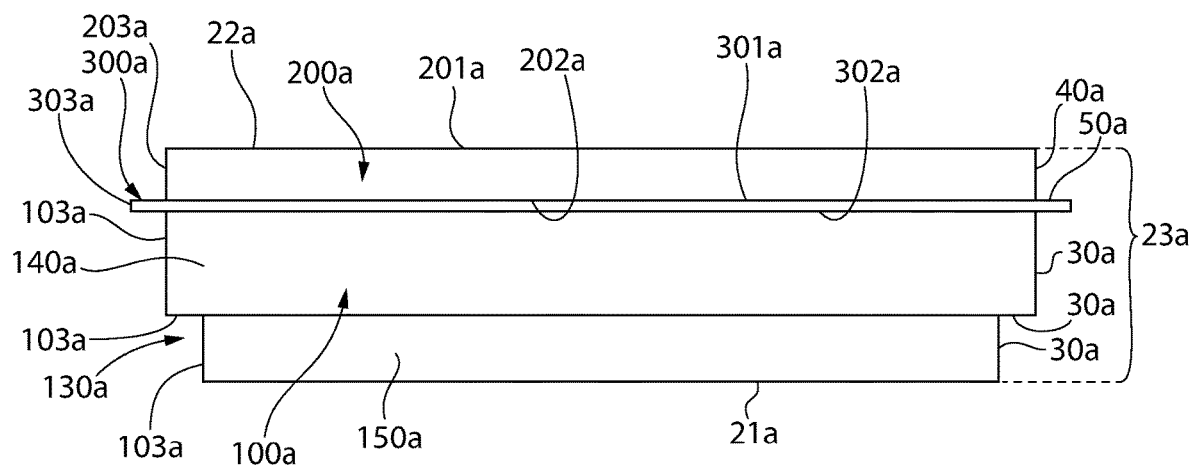
FIG. 9 is a side view of the acoustic ceiling panel of FIG. 5.
Figure 10:
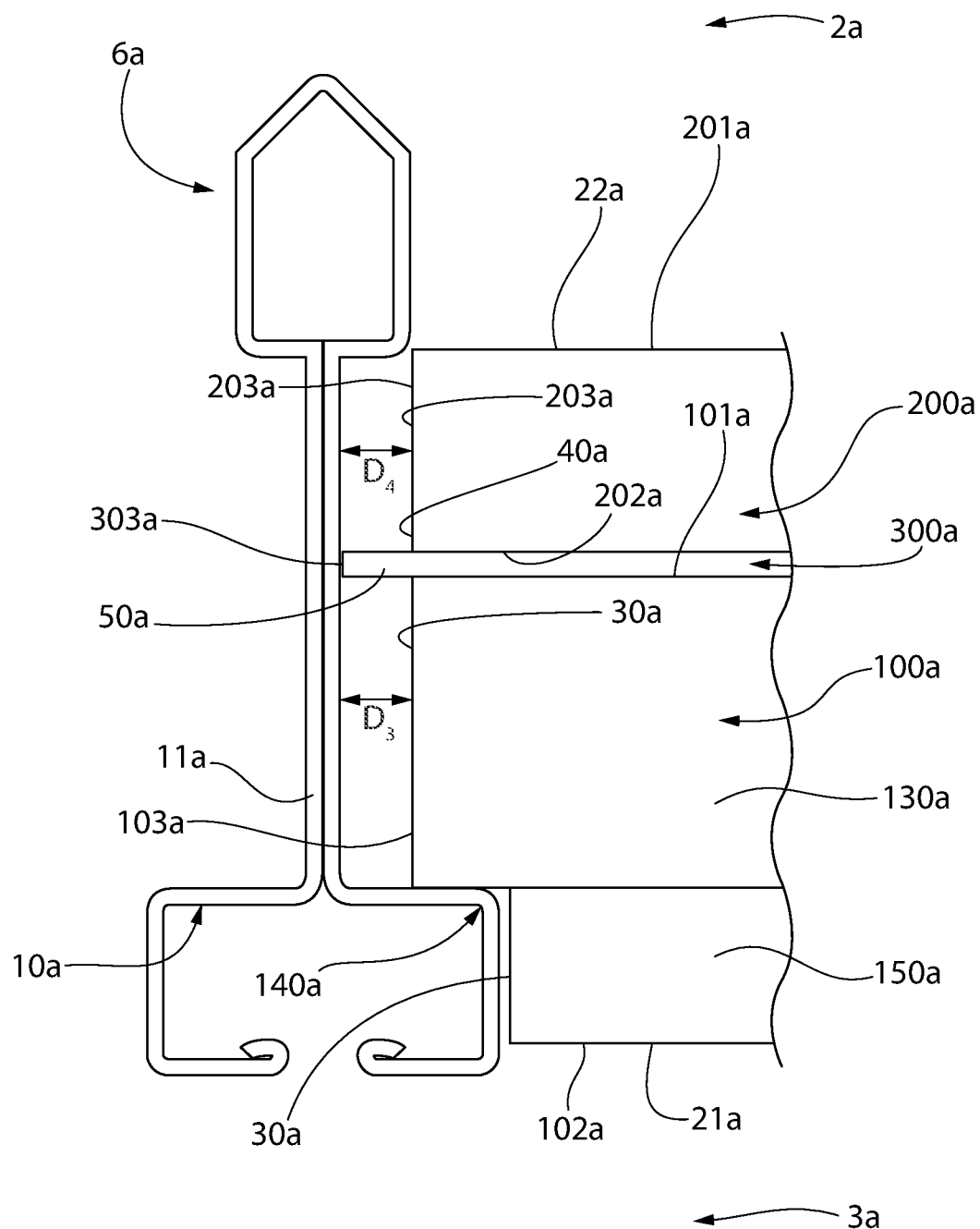
FIG. 10 is a close-up view of the acoustic ceiling panel of FIG. 9 installed into the ceiling system of the present disclosure.

Referring now to FIGS. 8-10, a building panel 20*a* (also referred to as a ceiling panel 20*a*) is illustrated in accordance with another embodiment of the present invention. The building panel 20*a* is similar to the building panel 20 except as described herein below. The description of the building panel 20*a* above generally applies to the building panel 20*a* described below except with regard to the differences specifically noted below. A similar numbering scheme will be used for the building panel 20*a* as with the building panel 20 except that the a-series of numbers will be used.

The ceiling panel 20*a* may comprise a first exposed major surface 21*a* opposite a second exposed major surface 22*a* and an exposed side surface 23*a* extending between the first exposed major surface 21*a* and the second exposed major surface 22*a*.

The exposed side surface 23*a* may comprise a first portion 30*a*, a second portion 40*a*, and a third portion 50*a*. The first portion 30*a* of the exposed side surface 23*a* may be located adjacent to the first exposed major surface 21*a* of the acoustic ceiling panel 20*a*. The second portion 40*a* of the exposed side surface 23*a* may be located adjacent to the second exposed major surface 22*a* of the acoustic ceiling panel 20*a*. The third portion 50*a* of the exposed side surface 23*a* may be located between the first portion 30*a* and the second portion 40*a* of the exposed side surface 23. The second portion 40*a* of the exposed side surface 23*a* may comprise a tegular edge 140 located immediately adjacent to the first exposed major surface 21*a* of the ceiling panel 20*a*.

The ceiling panel 20*a* may comprise a first layer 100*a*, a second layer 200*a*, and a third layer 300*a*. The first layer 100*a* may comprise a first major surface 101*a* opposite a second major surface 102*a*. The first layer 100 may comprise a side surface 103*a* that extends between the first major surface 101*a* and the second major surface 102*a* of the first layer 100*a*.

The first layer 100*a* may comprise an upper portion 130*a* and a lower portion 150*a*. Together, the upper portion 130*a* and the lower portion 150*a* define the tegular edge geometry 140*a* of the first portion 30*a* of the exposed side surface 23*a* of the ceiling panel 20*a*. The lower portion 150*a* may form the first exposed major surface 21*a* of the ceiling panel 20 and the upper portion 130*a* may form the first major surface 101*a* of the first layer 100*a*.

When installed, the upper portion 130*a* of the first layer 100*a* may rest on the horizontal flange 10 of the support member 6, 7. When installed, the lower portion 150*a* of the first layer 100*a* may be located below the horizontal flange 10 of the support member 6, 7.

What is claimed is:

1. An acoustical ceiling panel comprising:
   a first layer comprising a first major surface opposite a second major surface and a side surface extending there-between, the first layer having a first thickness measured between the first and second major surfaces of the first layer;
   a second layer comprising a first major surface opposite a second major surface and a side surface extending there-between, the second layer having a second thickness measured between the first and second major surfaces of the second layer;
   a sealing layer having a first major surface opposite a second major surface and a side surface extending there-between, the sealing layer having a third thickness measured between the first and second major surfaces of the sealing layer, the third thickness being less than each of the first and second thicknesses; and
   wherein the sealing layer is positioned between the first major surface of the first layer and the second major surface of the second layer, and wherein the side surface of the sealing layer extends beyond the side surface of the first layer and the side surface of the second layer; and
   wherein the first major surface of the first layer has a first surface area, the second major surface of the second layer has a second surface area, and the first major surface of the sealing layer has a third surface area, the third surface area being greater than each of the first and second surface areas.

2. The acoustical ceiling panel according to claim 1, wherein a first ratio of the third surface area to the first surface area ranges from 1.02:1 to 1.03:1, and a second ratio of the third surface area to the second surface area ranges from 1.08:1 to 1.1:1.

3. The acoustical ceiling panel according to claim 1, wherein a third ratio of the first surface area to the second surface area ranges from 1.06:1 to 1.07:1.

4. The acoustical ceiling panel according to claim 1, wherein the first thickness of the first layer ranges from 0.25 inches to 3.0 inches, and wherein the first layer comprises a first body formed of fibrous material, and wherein the second thickness of the second layer ranges from 0.25 inches to 3.0 inches, and wherein the second layer includes a second body comprising a sound attenuation material.

5. The acoustical ceiling panel according to claim 1, wherein the first layer is formed from a fibrous material, the second layer is formed from a sound attenuation material, and the sealing layer is formed from a flexible material.

6. The acoustical ceiling panel according to claim 1, wherein third thickness of the sealing layer ranges from 0.015 inches to 1.0 inches, and wherein the sealing layer is formed of a flexible material.

7. The acoustical ceiling panel according to claim 1, wherein the side surface of the first layer defines a first perimeter of the first layer, the side surface of the second layer defines a second perimeter of the second layer, and the side surface of the sealing layer defines a third perimeter of the sealing layer, the sealing layer comprising a perimeter region adjacent to the third perimeter and a central region circumscribed by the perimeter region, and wherein the perimeter region of the sealing layer protrudes beyond the side surfaces of the first and second layers along an entirety of the first perimeter of the first layer and an entirety of the second perimeter of the second layer.

8. An acoustical ceiling panel comprising:
   a first layer comprising a first major surface opposite a second major surface and a side surface extending there-between, the side surface of the first layer defining a first perimeter of the first layer;
   a second layer comprising a first major surface opposite a second major surface and a side surface extending there-between, the side surface of the second layer defining a second perimeter of the second layer;
   a sealing layer comprising a first major surface opposite a second major surface and a side surface extending there-between, the side surface of the sealing layer defining a third perimeter of the sealing layer, the sealing layer further comprising a perimeter region adjacent the third perimeter and a central region circumscribed by the perimeter region of the sealing layer; and wherein the sealing layer is positioned between the first layer and the second layer such that the perimeter region of the sealing layer protrudes beyond the side surfaces of the first and second layers along an entirety of the first perimeter of the first layer and an entirety of the second perimeter of the second layer, and wherein the perimeter region of the sealing layer can flex upward and downward relative to the central region of the sealing layer.

9. The acoustical ceiling panel according to claim 8, wherein the perimeter region of the sealing layer can flex so as to contact the side surface of the first layer and the side surface of the second layer.

10. The acoustical ceiling panel according to claim 8, wherein the central region of the sealing layer overlaps with the first major surface of the first layer and with at least a portion of the second major surface of the second layer, and wherein the perimeter region of the sealing layer does not overlap with the first major surface of the first layer or with the second major surface of the second layer.

11. The acoustical ceiling panel according to claim 8, wherein the sealing layer has a planar top surface and a planar bottom surface, the planar top and bottom surfaces being parallel to an exposed top surface of the acoustical ceiling panel and to an exposed bottom surface of the acoustical ceiling panel.

12. The acoustical ceiling panel according to claim 8, wherein the perimeter region of the sealing layer has a constant thickness measured between the first and second major surfaces of the sealing layer.

13. The acoustical ceiling panel according to claim 8, wherein the first layer has a first thickness measured between the first and second major surfaces of the first layer, the second layer has a second thickness measured between the first and second major surfaces of the second layer, and the sealing layer has a third thickness measured between the first and second major surfaces of the sealing layer, the third thickness being less than the first and second thicknesses.

14. The acoustical ceiling panel according to claim 8, wherein the first layer is formed of a fibrous material, the second layer is formed of a sound attenuation material, and the third layer is formed of a flexible material.

15. An acoustical ceiling panel comprising a first exposed major surface opposite a second exposed major surface and an exposed side surface extending there-between, the exposed side surface comprising:
a first portion that is adjacent to the first exposed major surface;
a second portion that is adjacent to the second exposed major surface; and
a third portion located between the first portion and the second portion;
wherein the third portion extends outward beyond the first and second portions along at least two non-adjacent sides of the exposed side surface;
wherein the first portion has a first thickness, the second portion has a second thickness, and the third portion has a third thickness, the third thickness being less than each of the first and second thicknesses; and
wherein the first portion of the exposed side surface is formed of a fibrous material, the second portion of the exposed side surface is formed of a sound attenuation material, and the third portion of the exposed side surface is formed of a flexible material.

16. The acoustical ceiling panel according to claim 15, wherein the fibrous material comprises inorganic fiber selected from the group consisting of mineral wool, rock wool, stone wool, and glass fibers, the sound attenuation material is selected from the group consisting of gypsum, cement board, granite, and ceramic board, and the flexible material is a polymeric material selected from closed cell foam and mass-loaded vinyl.

17. The acoustical ceiling panel according to claim 15, wherein the third portion of the exposed side surface comprises an upper side surface opposite a lower side surface and an edge extending therebetween, wherein the edge of the third portion comprises a first edge portion and a second edge portion, the first edge portion extending from the upper side surface of the third portion to the second edge portion, and the second edge portion extending from the first edge portion to the lower side surface of the third portion of the exposed side surface, wherein at least one of the first edge portion and the second edge portion extend at an angle that is oblique to the upper side surface and the lower side surface of the third portion of the exposed side surface.

18. The acoustical ceiling panel according to claim 15, wherein the third portion of the exposed side surface is configured to flex upwardly towards the first exposed major surface and downwardly towards the second exposed major surface relative to the first and second portions of the exposed side surface.

19. The acoustical ceiling panel according to claim 15, wherein the third portion extends outward beyond the first and second portions along all sides of the exposed side surface.

* * * * *